Jan. 15, 1935.  E. BLAICH  1,988,294

ELECTRIC TRANSLATING CIRCUIT

Filed Oct. 12, 1932

Inventor:
Emil Blaich,
by Charles E. Mueller
His Attorney.

Patented Jan. 15, 1935

1,988,294

UNITED STATES PATENT OFFICE 1,988,294

ELECTRIC TRANSLATING CIRCUIT

Emil Blaich, Berlin, Germany, assignor to General Electric Company, a corporation of New York Application October 12, 1932, Serial No. 637,487
In Germany November 10, 1931

3 Claims. (Cl. 171—97)

My invention relates to electric translating circuits and more particularly to such circuits suitable for exciting grid controlled vapor electric discharge devices.

Heretofore there have been devised numerous circuits for exciting electric valves of the vapor electric discharge type in which the starting of current in a valve is determined by the potential on its control grid but in which current through the valve can be interrupted only by reducing its anode potential below the critical value. It is well known in the art that with this type of valve the most effective control is obtained by exciting the grid with a potential having a steep wave front. When a vapor electric valve is utilized in an alternating current circuit, it has been found that the valves may be satisfactorily controlled by impressing upon the grid an alternating potential of a peaked wave form.

It is an object of my invention, therefore, to provide a new and improved arrangement for producing a periodic potential of peaked wave form, such as is suitable for exciting a valve of the vapor electric discharge type.

In accordance with my invention, a self-saturating reactor and an impedance device, such for example, as a resistor, capacitor or inductor, or a combination of these elements, the only limitation being that the voltage across it shall vary substantially linearly with the current through the impedance, are serially connected across a source of alternating current. By so designing the reactor that it is saturated only during the peaks of the alternating magnetizing current the impedence of this circuit is substantially reduced during these intervals with the corresponding sudden increase in the current in the circuit during these intervals. The result is that the alternating potential appearing across the resistor includes very sharp peaks synchronous with the peaks in the alternating current supply.

Figure 1:
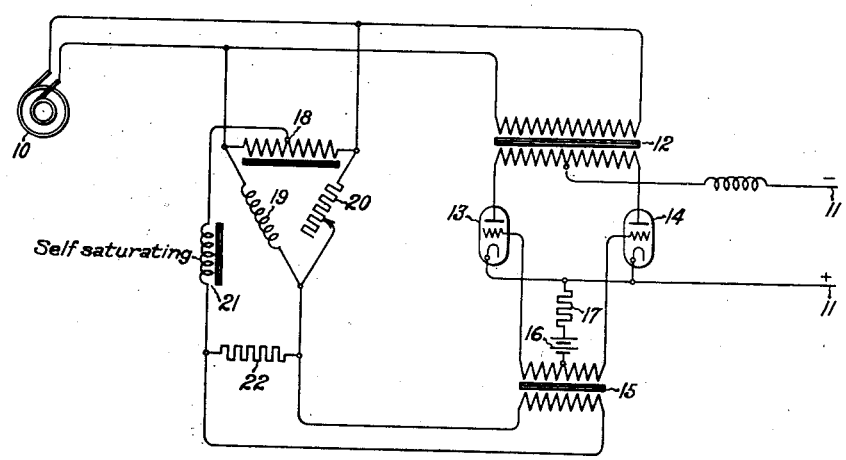
Figure 2:
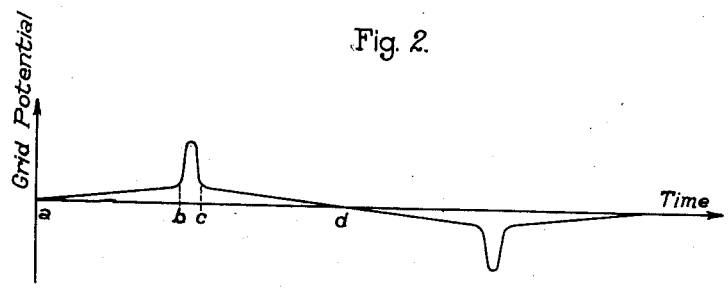

For a better understanding of my invention, together with other and further objects thereof, reference is had to the following description taken in connection with the accompanying drawing and its scope will be pointed out in the appended claims. Fig. 1 of the accompanying drawing illustrates an arrangement embodying my invention for controlling a rectifier utilizing valves of the vapor electric discharge type, while Fig. 2 represents the wave form of alternating potential impressed upon the valve grids of the arrangement of Fig. 1.

Referring now to the drawing, there is illustrated an arrangement for transmitting energy from a source of alternating current 10 to a direct current circuit 11. This apparatus comprises a transformer 12 and a pair of electric valves 13 and 14 connected in a conventional manner to secure full wave rectification. Each of the valves 13 and 14 is provided with an anode, a cathode, and a control grid and is of the vapor electric discharge type. The grids of the valves 13 and 14 are connected to their common cathode circuit through opposite halves of the secondary winding of the grid transformer 15, a negative bias battery 16 and a current limiting resistor 17. As is well known in the art, the output of such a rectifying arrangement can be readily controlled by applying to the grids of the valves 13 and 14 periodic potentials variable in phase with respect to their anode potentials. Such a variable phase potential may be secured by any suitable phase shifting arrangement energized from the alternating current source 10 and I have illustrated by way of example an impedance phase shifting circuit comprising a mid-tapped reactor 18 connected across the source 10 and a reactor 19 and variable resistor 20 connected in parallel to the reactor 18. Between the electrical midpoint of the reactor 18 and the junction between the reactor 19 and the resistor 20 are serially connected a self-saturating reactor 21 and a resistor 22, while the primary winding of the transformer 15 is energized across resistor 22. The self-saturating reactor 21 is provided with a magnetic circuit which is preferably proportioned so that it will saturate at a point in the cycle of alternating potential just less than its maximum value. The impedance element or resistor 22 has an impedance value which is relatively low compared to the high impedance presented by the reactor 21. In other words, the apparent resistance of the reactor 21 is relatively high compared to the value of the resistor 22.

The general principles of operation of the above described controlled rectifier will be well understood by those skilled in the art. In brief, if the grids of the valves 13 and 14 are excited at or near the initial points in their positive half cycles of anode potential, these valves will be conductive during their complete half cycles and the average voltage supplied to the circuit 11 will be a maximum. If the point in the cycles of anode potential of the valves 15 and 14 at which their grids are excited is retarded each of the valves will conduct current for correspondingly shorter periods of their respective half cycles of positive anode potential to reduce the average voltage supplied to the load circuit 11. It will be apparent to those skilled in the art that the alternating potential applied to the circuit including the reactor 21 and the resistor 22 may be varied in phase by varying the adjustable resistor 20. The manner in which the potential of sinusoidal wave form is converted into one of peaked wave form may be readily understood by reference to the curve of Fig. 2. In this curve, the portion *ab* represents the initial portion of the cycle of alternating potential during which the reactor 21 is unsaturated and has a substantial impedance. During this interval the current in the circuit including resistor 22 is limited to a very small value with the result that terminal potential of the resistor is correspondingly small. At the point *b* the magnetic core of the reactor 21 becomes saturated, the impedance is correspondingly decreased and a rapid increase in current occurs in the circuit including resistor 22. This increased current has a duration of the interval *bc* and produces a resistance drop across the resistor 22, as illustrated in the curve of Fig. 2. At the point *c* the reactor 21 again becomes desaturated, reducing the current in resistor 22 and its terminal voltage. In this manner the sinusoidal alternating potential supplied by the source 10 is converted into one having a very pronounced peak with a steep wave front which is particularly suitable for exciting valves of the vapor electric discharge type.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. An electric translating circuit comprising a source of periodic potential, apparatus for deriving from said source a periodic potential of peaked wave form comprising a self-saturating reactor proportioned to saturate near the maximum value of said periodic potential and an impedance relatively low in value serially connected across said source, and an output circuit energized with the potential across said impedance.

2. An electric translating circuit comprising a source of alternating potential, apparatus for deriving from said source an alternating potential of peaked wave form comprising a self-saturating reactor and a resistor serially connected across said source, and an output circuit connected across said resistor.

3. An electric translating circuit comprising a source of periodic potential, apparatus for deriving from said source a periodic potential of peaked wave form comprising a reactance device provided with a magnetic circuit proportioned to saturate near the maximum value of said periodic potential source, a resistor serially connected with said reactance device across said source, and an output circuit energized with the potential across said resistor.

EMIL BLAICH.